United States Patent [19]
Herklotz et al.

[11] Patent Number: 5,778,551
[45] Date of Patent: Jul. 14, 1998

[54] COORDINATE MEASURING APPARATUS HAVING A DEVICE FOR PROFILE MEASUREMENTS AND METHOD FOR MAKING SAID PROFILE MEASUREMENTS

[75] Inventors: Henrik Herklotz; Thomas Arndt, both of Berlin; Rainer Ohnheiser, Lauterstein; Karl Schepperle, Oberkochen, all of Germany

[73] Assignee: Carl-Zeiss-Stiftung, Heidenheim, Germany

[21] Appl. No.: 613,846

[22] Filed: Mar. 11, 1996

[30] Foreign Application Priority Data

Mar. 11, 1995 [DE] Germany .................. 195 08 861.1

[51] Int. Cl.⁶ .............................. G01B 7/28; G01B 7/004
[52] U.S. Cl. ................................ 33/554; 33/503; 33/551
[58] Field of Search ........................... 33/554, 503, 504, 33/501.02, 501.03, 501.04, 533, 551, 553, 555

[56] References Cited

U.S. PATENT DOCUMENTS

| | | | |
|---|---|---|---|
| 3,135,055 | 6/1964 | Butler et al. | 33/505 |
| 3,650,036 | 3/1972 | Coveney et al. | 33/554 |
| 3,869,799 | 3/1975 | Neuer et al. | 33/503 |
| 4,377,911 | 3/1983 | Iida et al. | 33/551 |
| 4,688,307 | 8/1987 | Schneider et al. | |
| 4,769,763 | 9/1988 | Trieb et al. | 33/503 |
| 5,146,690 | 9/1992 | Breitmeier | 33/501.03 |
| 5,152,072 | 10/1992 | McMurtry et al. | 33/503 |
| 5,189,806 | 3/1993 | McMurtry et al. | 33/554 |
| 5,471,406 | 11/1995 | Breyer et al. | |

FOREIGN PATENT DOCUMENTS

| | | |
|---|---|---|
| 0082441 | 6/1983 | European Pat. Off. |
| 0420416 | 4/1991 | European Pat. Off. |
| 0569694 | 11/1993 | European Pat. Off. |
| 2242355 | 3/1974 | Germany |
| 63-289410 | 11/1988 | Japan |
| 63/289410 | 11/1988 | Japan |
| 1429973 | 3/1976 | United Kingdom |
| WO/92/06350 | 4/1992 | WIPO |
| WO/92/06351 | 4/1992 | WIPO |

OTHER PUBLICATIONS

"Integration of a Surface Measuring Device into a Coordinate Measuring Machine" by H. U. Golz et al, Quality Europe, Nr. 1, 1991, pp. 32 to 34.

"Koordinatenmeβtechnik und Werkstück–Mikrogeometrie" by N. M. Durakbass et al, F & M Feinwerktechnik & Messtechnik, vol. 95, Nr. 1987, p. 526 to 530.

"Integration eines Tastschnittgeräts zur Rauheitsmessung in ein Koordinatenmessgerät" by H. U. Golz et al, in Qualitätszeitschrift, no. 35 vol. 12, (1990), pp. 713 to 715.

"Massstäbe", published by Leitz Messtechnik GmbH, Oct. 1994, p. 7.

"DIN 4762 = ISO 4287/1", Jan. 1989.
"DIN 4768", May 1990.
"DIN 4772", Nov. 1979.
"DIN 4777", May 1990.

Primary Examiner—Christopher W. Fulton
Attorney, Agent, or Firm—Walter Ottesen

[57] ABSTRACT

For roughness measurements, a passive roughness probe 118 having a probe tip 119 is exchanged into the measuring probe head of the coordinate measuring apparatus in lieu of the probe pin having a probe ball which is otherwise used to make coordinate measurements. The generation of the measurement points takes place while using the already available measured value transducers 23 in the probe head of the coordinate measuring apparatus. The desired surface characteristic variables are computed from the stored quasi-analog measured point sequence with the aid of a corresponding software module.

15 Claims, 5 Drawing Sheets

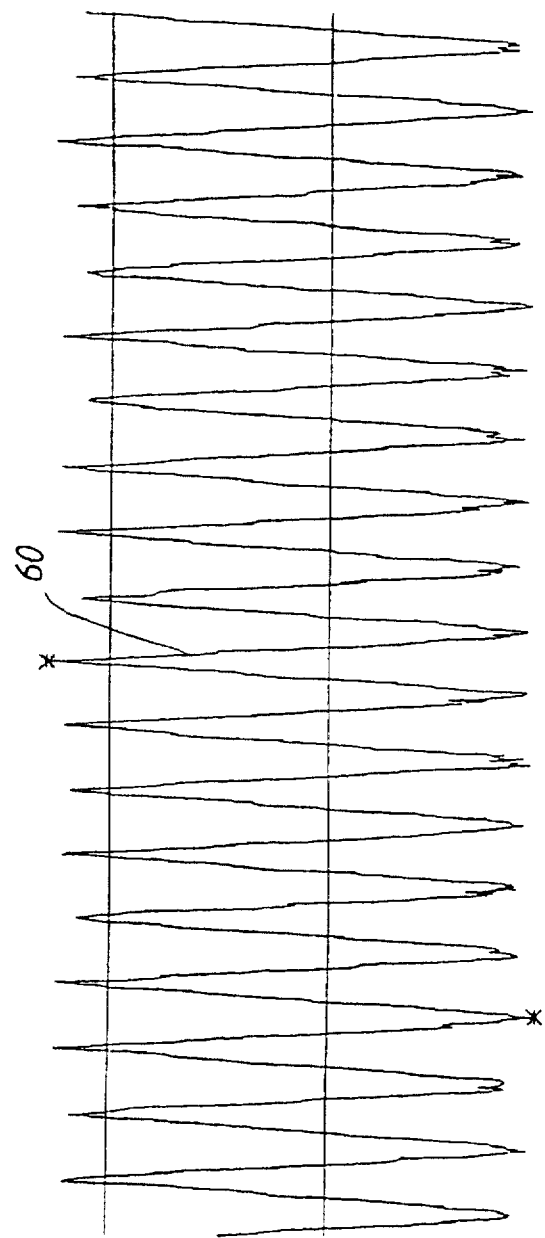

US 5,778,551

COORDINATE MEASURING APPARATUS HAVING A DEVICE FOR PROFILE MEASUREMENTS AND METHOD FOR MAKING SAID PROFILE MEASUREMENTS

BACKGROUND OF THE INVENTION

The geometric dimensions of workpieces are determined today mostly with the aid of coordinate measuring apparatus. These are instruments wherein a so-called probe head has a probe ball which is attached to a pin journalled so that it can yield. The probe head is moved by three orthogonal guides and the drives associated therewith in a measurement volume of typically 1 mm$^3$. The coordinate measuring apparatus can be subdivided into those apparatus having a "switching" probe head and those equipped with a "measuring" probe head. The coordinate measuring apparatus equipped with the switching probe head generate a pulse-shaped trigger signal when contacting the workpiece and only individual point measurements are possible therewith. Coordinate measuring apparatus equipped with a measuring probe head are described in British Patent 1,429,973 as well as in U.S. Pat. No. 5,623,766.

In addition to making determinations of dimensions and position on workpieces, coordinate measuring apparatus equipped with such measuring probe heads can also make form measurements. These form measurements are made in that the probe ball, which is journalled to yield in three degrees of freedom, is in continuous contact with the surface of the workpiece along which the ball is guided. In this way, the measurement point sequence assumed at machine clock frequency during the scanning movement, is recorded and graphically outputted as a quasi-analog form plot.

Up to now, however, separate contact stylus instruments have been utilized to determine deviations in shape of higher order such as waviness and roughness on workpieces. In these instruments, contact electromechanical probe systems are mostly used which have a one-dimensional deflectable measuring probe as well as a diamond tip attached thereto. After appropriate alignment, this diamond tip is moved with a low measuring force by a displacing device over the particular workpiece surface. A proportional measurement signal is generated in the measuring system by the deflection of the measuring probe. Such surface probes are, for example, available from Feinpruf Perthen GmbH of Göttingen, Germany, under the designation "Perthometer" and are described in this company's catalogue entitled "Perthometer, Messplatzzubehör für Oberflächenmess- und Registriergeräte", publication number 3752755, Aug. 1, 1992. With respect to the characteristic variables of surfaces to be determined with such apparatus, reference can be made to appropriate German industrial standards (DIN), inter alia, DIN 4762=ISO 4287/1, DIN 4768 and DIN 4772.

The complete shape of a surface of a workpiece has been detected up to now utilizing different measuring apparatus. Thus, coordinate measuring apparatus were used for dimensions, position and form and contact stylus instruments were used to measure roughness and waviness. This requires a very substantial effort which is not only caused by acquiring these apparatus but also the loss of time which results from resetting and arranging to make the measurements on the different measuring apparatus.

It has already been suggested to reduce this effort by mounting contact stylus instruments directly on the probe head of a coordinate measuring apparatus. A coordinate measuring apparatus having a switching probe head is described, for example, in an article entitled "Integration eines Tastschnittgeräts zur Rauheitsmessung in ein Koordinatenmessgerät" published in QZ, number 35, volume 12, (1990), pages 713 to 715. In this probe head, a complete contact stylus instrument is provided in lieu of the conventional rigid probe pin having a probe ball. The contact stylus instrument is equipped with an active electromechanical slide probe system including the corresponding displacing unit. The current supply for the displacing unit and the transmission of the measurement signals of the contact stylus instrument are conducted via contacts at the exchange location of the probe head. With this solution, the coordinate measuring apparatus functions only to position the contact stylus instrument at the location to be checked. The measurement of roughness is then carried out with the aid of the freshly mounted contact stylus instrument.

Several contact stylus instruments (for example, up to seven differently aligned contact stylus instruments) are required if, for example, an engine block is to be checked as to surface roughness in an automatic sequence with such a system. The several contact stylus instruments are needed in order to scan the workpiece surface at different measuring locations or the contact stylus instrument must be aligned manually many times. Both procedures are relatively complex.

Japanese patent publication number JP 63-289410 discloses a coordinate measuring apparatus wherein the probe head utilized for the coordinate measurements can be exchanged for a special electromechanical roughness measurement probe which is likewise active. This roughness measurement probe has no displacing device of its own; instead, this roughness measurement probe is guided by the drives of the coordinate measurement device over the surface to be checked. It is disadvantageous here that the probe head must be exchanged which is problematical and not only because of the many electrical connections which must then be separated. This known system also requires several differently aligned contact stylus instruments when parts having greater complexity are to be measured automatically in one setup.

A roughness sensor is briefly described in the publication "Massstabe", published by Leitz Messtechnik GmbH, October 1994, page 7. This roughness sensor is automatically seated in the corresponding receptacle on the probe head of a coordinate measuring apparatus in lieu of the probe pin. The roughness sensor is, in turn, an active electromechanical slide contact system and is exchangeably mounted in a switching probe head as described in the above-mentioned article published in QZ, pages 713 to 715. Only the displacing unit of the contact stylus instrument is omitted and displacement is realized by the drives of the coordinate measuring apparatus.

In the measuring apparatus known in the state of the art, the surface characteristic values or roughness characteristic values are either evaluated in a separate evaluation unit, a separate measurement computer, or with special software offered for roughness measurement apparatus. If necessary, these roughness characteristic values can be taken into the measurement protocol of the coordinate measuring apparatus as data in addition to the results of the macro geometric examination. However, no exact spatial relationship of the measurement locations exists for the surface measurements to the coordinate system of the coordinate measuring apparatus, that is, of the workpiece measured thereon.

SUMMARY OF THE INVENTION

It is an object of the invention to provide a coordinate measuring apparatus with which roughness measurements on workpiece surfaces can be carried out in a manner as simple as possible in addition to coordinate measurements and form measurements. It is a further object of the invention to provide a measurement method for making a roughness measurement with such apparatus.

The method of the invention is for measuring roughness of a surface of a workpiece with a coordinate measuring apparatus including a probe head having a coordinate measuring probe for making coordinate measurements on a workpiece and having signal transducers mounted therein for supplying measurement signals. The method includes: replacing the coordinate measuring probe with a passive probe having a contact probe body defining a tip suitable for making roughness measurements; scanning the surface with the contact probe body with a slight force ($F_x$, $F_y$, $F_z$) applied via the probe head on the surface of the workpiece to obtain the measurement signals (x', y', z') outputted by the signal transducers; processing the measurement signals (x', y', z') and storing the same as digital measured point sequences; and, determining roughness characteristic variables of the surface from the measured point sequences.

According to the invention, the geometric deviations of a workpiece and the roughness of the surface thereof are determined with the aid of one and the same probe system, namely, the measuring probe head on the coordinate measuring apparatus while utilizing the measurement value transducers provided therein for the three measuring axes (x, y, z). A separate contact stylus instrument is therefore no longer required and exchanging operations which cause electrical signal lines and supply lines to be separated are no longer needed. Furthermore, the workpiece to be checked can be measured also with respect to its surface characteristics with computerized workpiece alignment and in the workpiece coordinate system.

The measuring probe head used for the coordinate measurements has measurement value transducers for all three spatial directions. For this reason, it is not necessary to rotate the probe head or to align the workpiece surface to be checked parallel to the guides (x, y, z) of the coordinate measuring apparatus because the multi-axis control of this apparatus permits a spatially inclined movement of the probe head or of the probe pin carrier. In lieu of this, and as conventional in coordinate measurement, a probe tip aligned with respect to the position of the surface to be checked is automatically exchanged with the aid of the probe exchange device of the probe head and the contact steps can be carried out as desired in the workpiece coordinate system. According to the invention, it is now possible for the first time to investigate and evaluate surface characteristic dependent functions (such as form-tight requirements, force-tight requirements, sliding characteristics, friction characteristics, and seal characteristics) of function surfaces on the workpiece in conjunction with and in dependence upon other macro geometric functions and characteristics. This investigation and evaluation can be performed with only one probe system. For example, sealing surfaces can now be checked in one setup with respect to position, form and with respect to their surface characteristics (roughness).

A separate evaluation circuit as for a newly mounted contact stylus instrument is not required because the already available functions of the probe head electronics, control and computer of the coordinate measuring apparatus can be used for the signal processing and measured value processing.

It is therefore only necessary to exchange the rigid probe pins having a probe ball for a probe tip having a tip radius of, for example, 2 to 5 micrometers as a rigid passive element. The rigid probe pins are adapted so that they can be exchanged for coordinate measurements and the probe tip is conventionally used for roughness measurements. However, as the active measurement system, the conventional probe measuring system provided in the probe head is used. This probe measurement system is used as in the classical coordinate measuring technology. The signal of this measuring system is supplied to a digital signal processing unit via an analog-to-digital converter. The signal processing unit also otherwise generates the measured values when detecting measured values, for example, for checking form with the scanning method.

A separate displacing unit for the contact stylus instrument is likewise not required. Rather, the contacting body for the roughness measurements, that is, the diamond tip is moved over the workpiece surface to be measured by the drives of the measuring slides of the coordinate measuring apparatus.

Power generators for deflecting the probe pin carriers are already available in the measuring probe heads mentioned above with respect to the state of the art. However, it is advantageous to utilize these power generators as the displacing unit for the roughness measurement. The probe pin is guided over the workpiece surface to be tested at standstill of the measuring slides of the coordinate measuring apparatus. In both cases, it is advantageous to computer correct known errors either of the guides of the measuring slides of the coordinate measuring apparatus or known errors of the guides of the deflectable probe pin carrier in order to have a plane or straight line available with very slight deviations from the ideal form as reference for the roughness measurement.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
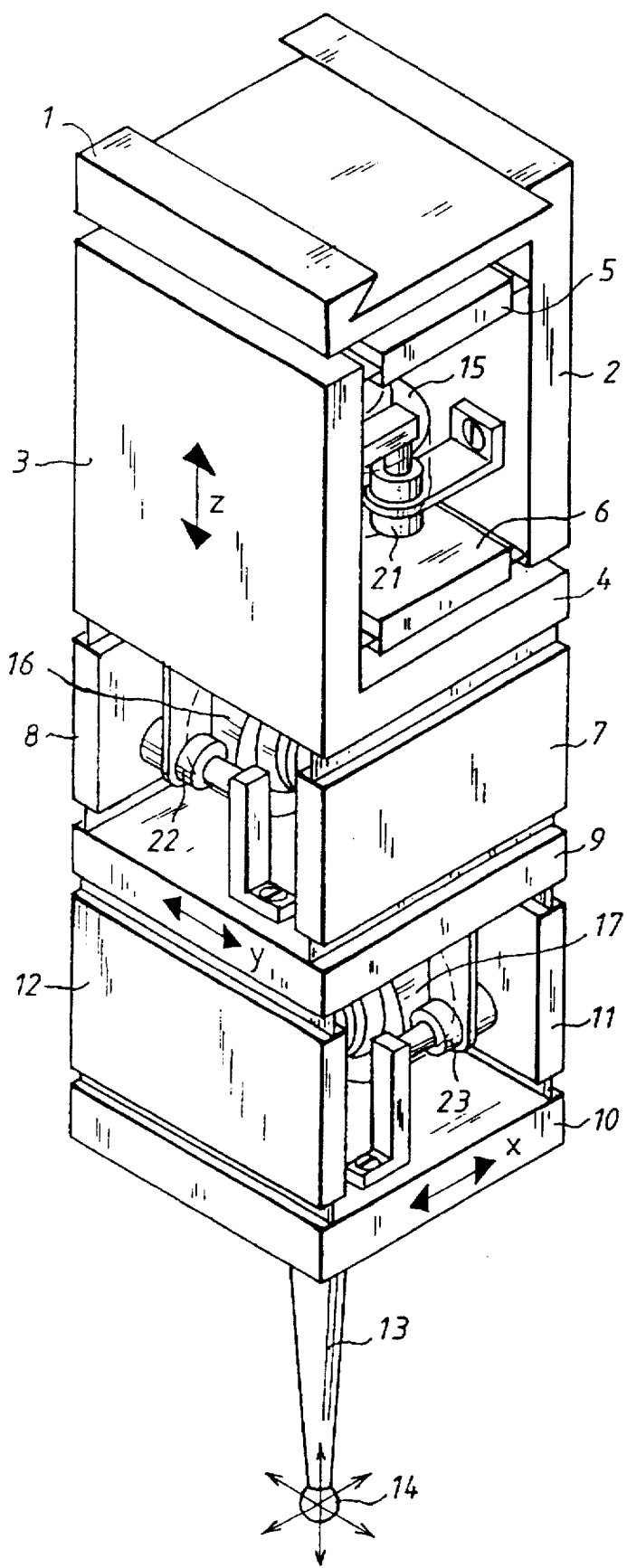
FIG. 1 is a perspective view showing the mechanical assembly of a measuring probe head for a coordinate measuring apparatus.

The probe head shown in FIG. 1 is equipped with a part permanently connected to the housing which has the shape of an angle and whose upper, horizontal leg 1 has a dovetail for mounting the probe head to the spindle of the coordinate measuring apparatus (not shown). The vertical leg 3 of a further L-shaped angle is connected to the vertical leg 2 of the part fixedly connected to the housing via a pair of mutually spaced spring steel sheets 5 and 6 reinforced in the center. The resulting parallelogram guide unit constitutes the z-guide unit of the probe head.

A plate 9 is movably suspended on the horizontal leg 4 of the angle movable in z-direction via a second pair of reinforced spring steel sheets 7 and 8. This plate 9 forms the y-guide unit of the probe head. On this plate, a third pair of spring steel sheets 11 and 12, rotated by 90° with respect to spring steel sheets 7 and 8, is suspended, which connects plate 9 to a further plate 10 which constitutes the x-guide unit of the probe head. The plate 10 carries a probe pin 13 having a probe ball 14.

Each of the three parallelogram guide units is equipped with a measuring force generator configured as a plunger coil drive. For this purpose, the first magnet 15 is mounted on the stationary leg 2, the second magnet 16 on the lower side of leg 4 and the third magnet 17 of the particular plunger coil drive on the plate 9 while the moving parts, that is, the solenoids of the plunger coil drives, are connected to the deflectable parts (3, 9, 10) of the z, y and x-guide units.

Also shown are the three measuring systems (21, 22, 23) which are used to continuously detect the deflections of the guided parts of the probe head in the three above-mentioned coordinate directions. These are so-called LVDT systems, that is, induction coils operated at a carrier frequency, which emit a displacement signal which is proportional to the position of the core displaceable within the coils.

Coordinate measuring apparatus having the probe head described above are commercially provided by Carl Zeiss of Oberkochen, Germany, under the product designation PRISMO and UPCM Carat. The probe head described above is also disclosed in U.S. Pat. No. 5,623,766, incorporated herein by reference.

Figure 2A:
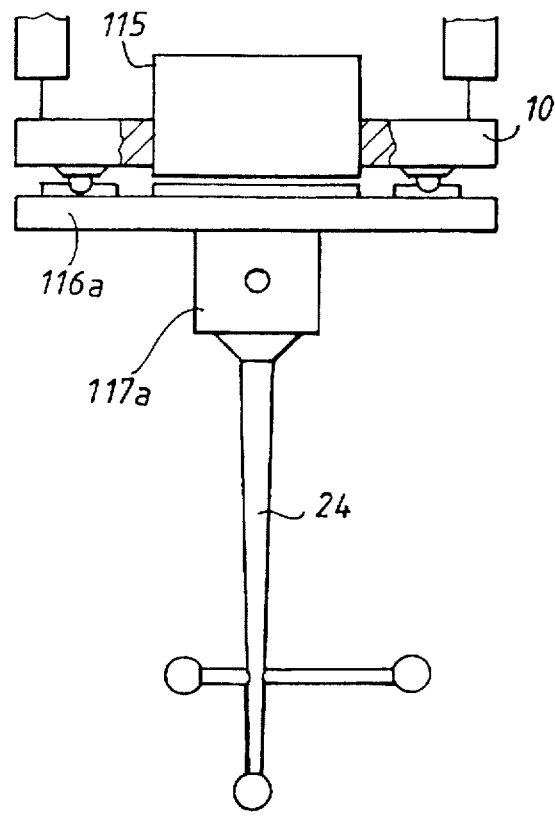
FIG. 2a is a simplified schematic which shows the probe pin carrier 10 of FIG. 1 equipped with a probe pin having a probe ball for the coordinate measurement or geometric check with the probe pin being attached to the probe pin carrier via the exchange device.
Figure 2B:
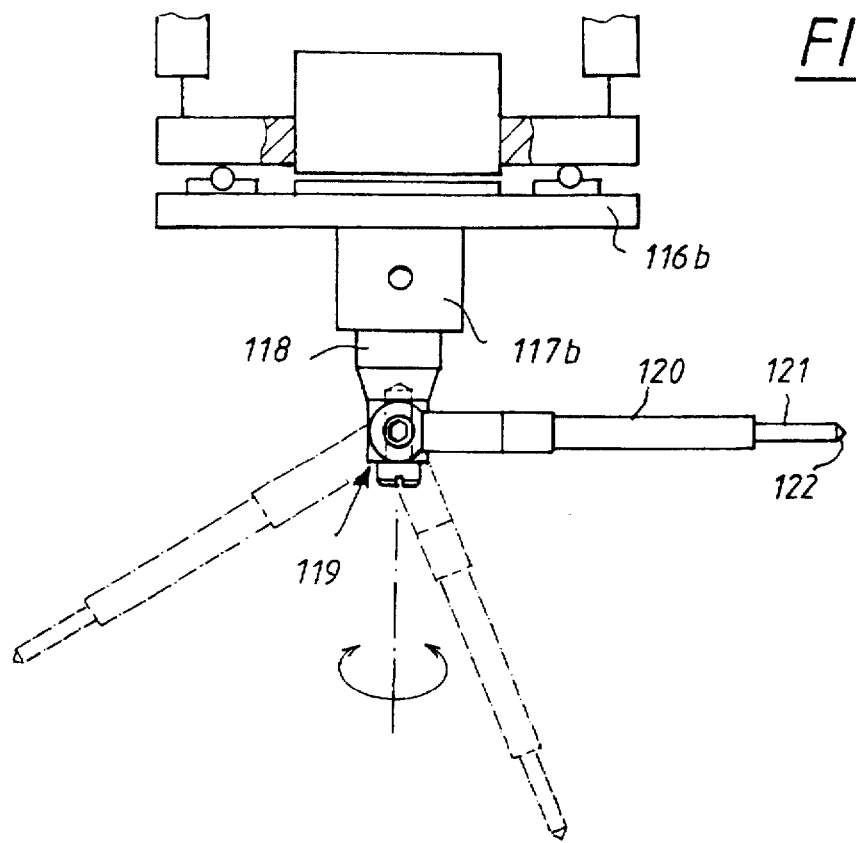
FIG. 2b is a simplified schematic which shows the probe pin carrier 10 of FIG. 1 equipped with a probe pin having a tip for roughness measurement on a workpiece; the probe pin is attached to the probe pin carrier via the exchange device.

For making checks as to dimension, position and form on a workpiece, the probe pin 13 having the probe ball 14 shown in FIG. 1 can be exchanged for probe pins of different geometries such as the star probe 24 shown in FIG. 2a. The probe exchange device is disclosed, for example, in U.S. Pat. No. 4,688,307 incorporated herein by reference. For this purpose, a three-point bearing is provided at the lower side of the plate 10 of the probe head. The three-point bearing is defined by three pairs of ball bearings. The exchange magnet 115 pulls the adapter plate 116a with the star probe 24 attached thereto. The adapter plate 116a engages into the ball bearing pairs with three corresponding cylinders.

For making roughness measurements on a workpiece, a pin, which is specifically manufactured for this purpose, is exchanged for the probe pin 13 or the star probe 24. This pin 121 has a diamond tip 122 having a tip radius of r=2 to 5 μm. The angle of the probe tip is 60°. In lieu thereof, pins having other diamond tips can be used. These other diamond tips have, for example, tip angles of 75° or 90° and/or other tip radii suitable for roughness measurement. The pin 121 is mounted on a joint 119 via an extension piece 120. The joint 119 is seated on the adapter cube 117b of the exchange plate 116b by means of a conical receptacle 118. The joint 119 permits the probe tip 122 to be aligned by rotation and pivoting in a semi-spherically shaped region below the probe head as indicated by the positions shown in phantom outline.

In the following, the control and detection of measured values of the coordinate measuring apparatus is described with reference to roughness measurements. The coordinate measuring apparatus is equipped with the probe head described above.

Figure 3A:
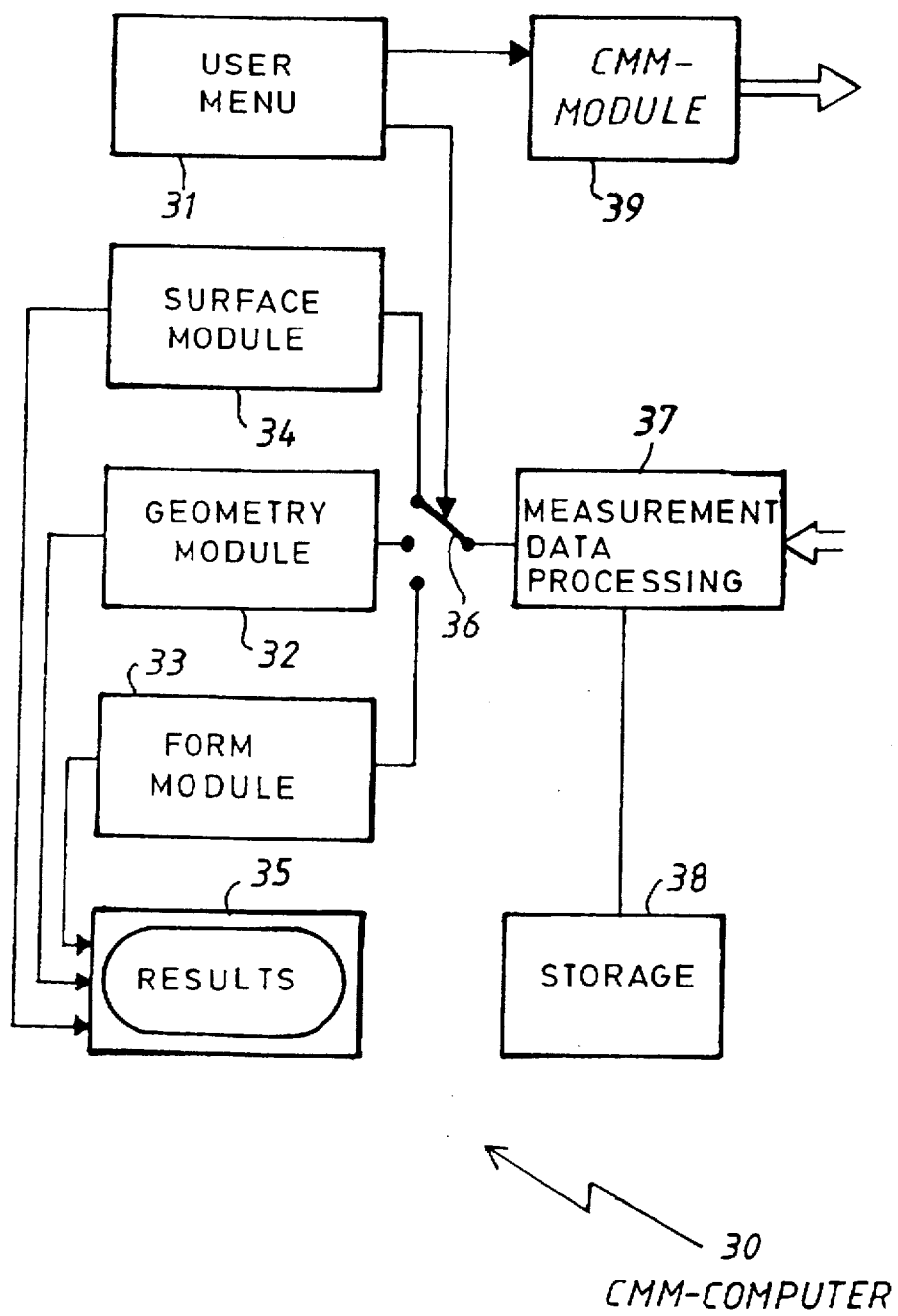
FIGS. 3a and 3b are block circuit diagrams showing the essential components of the electronics and software of a coordinate measuring apparatus suitable for roughness measurements; the components are used for control and for obtaining measured values; and, FIG. 4 is a diagram which shows the measured values obtained during a roughness measurement on a roughness standard.

In FIG. 3a, the computer of the coordinate measuring apparatus is identified by reference numeral 30. The computer controls the measuring sequences and processes and evaluates the measured values obtained from the coordinate measuring apparatus. For this purpose, the measuring software utilized for this task has an operator-control panel (user menu) 31 via which the operator can issue the commands required for the measuring sequence. The software furthermore includes the suitable apparatus module which is that part of the software which converts the commands of the operator into corresponding control commands which are necessary for moving the measuring slide of the coordinate measuring apparatus with pregiven speed and direction and which supply the solenoid drives (15, 16, 17) in the probe head with the necessary current for the desired measuring force.

Furthermore, the software includes three different evaluating modules, namely: a module 32 for geometric measurements, a module 33 for form measurements and a module 34 for surface measurements such as waviness and roughness. The above-mentioned three modules evaluate the measured values of the probe head obtained from the control of the coordinate measuring apparatus and the measured values of the length measuring system in the axes of the apparatus corresponding to the selected measuring task of geometric measurement or form measurement or, for example, roughness measurement. The evaluated results are then shown on a display device 35, that is, a monitor, printer or plotter.

The operator selects the evaluation module needed for the measuring task via the operator-control panel 31. This is shown by the switch 36.

The measured values of the inductive probes (21, 22, 23) and the measured values of the length measuring system in the traversable axes of the coordinate measuring apparatus are obtained from the control of the coordinate measuring apparatus and are processed in a subprogram 37 and are thereafter stored in a memory 38. The above-mentioned three evaluation modules (32, 33, 34) of the software access the measured values in the probe head of the apparatus. This is described in greater detail below.

Figure 3B:
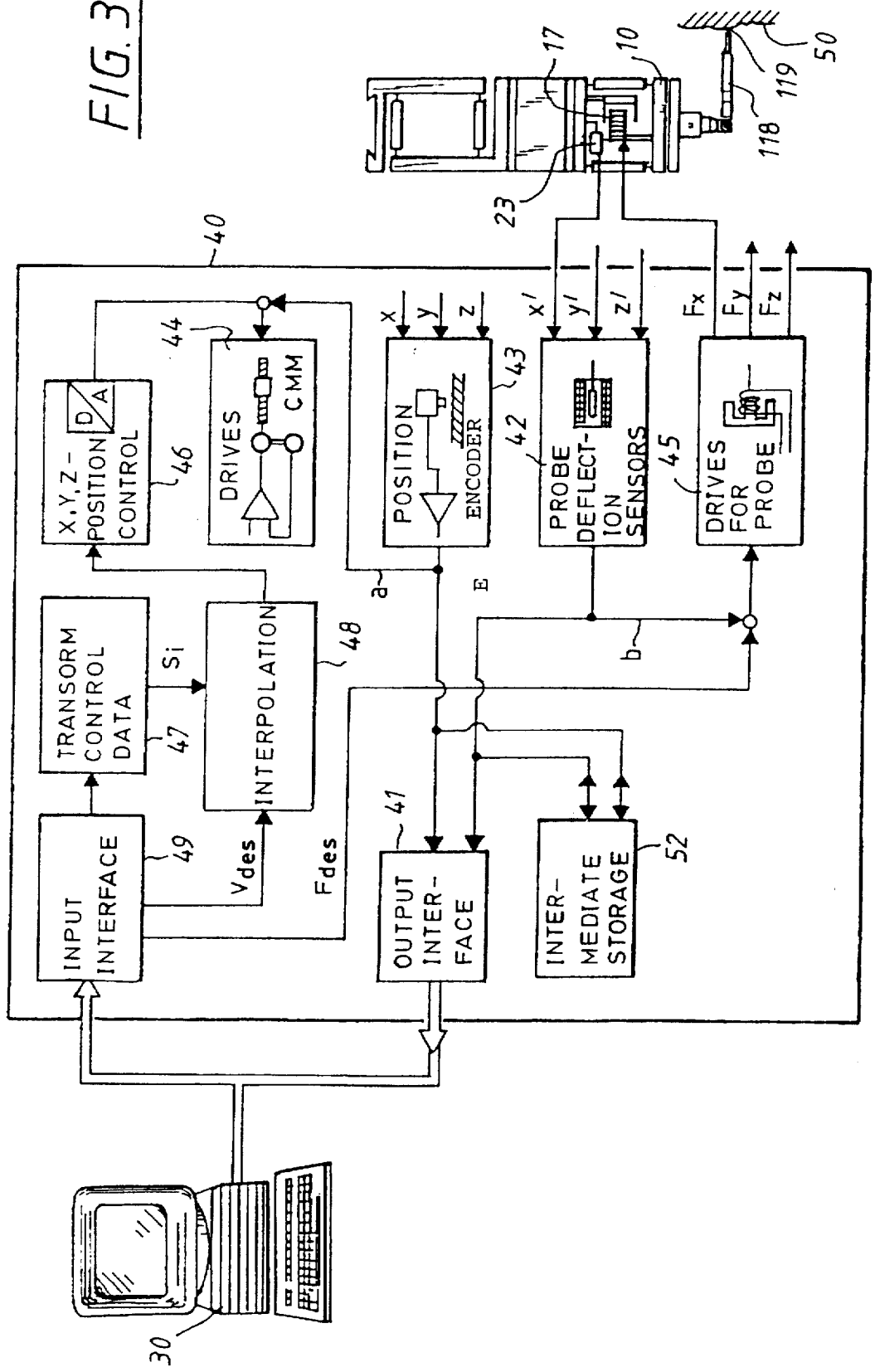

The computer 30 receives the above-mentioned measured values from the control 40 of the coordinate measuring apparatus via a transmission interface 41. The control is shown in FIG. 3b in the form of function blocks. The measured values (x', y', z') define the deflection of the probe pin carrier 10 and are generated in a function block 42 identified as "probe deflection sensors". There, the analog output signals of the three inductive measuring systems (21, 22, 23) are filtered, amplified and converted into digital signals which are read into an intermediate memory 52 at the fastest possible internal machine clock frequency. In the same manner, the function block 43 (position encoder) ensures that the sinusoidally-shaped output signals of the incremental length measuring systems of the coordinate measuring apparatus are, in three measurement axes (x, y, z), interpolated in a manner known per se and are counted and then read into the intermediate memory 52 as digital coordinate measured values. The content of the intermediate memory 52 is either, after completion of the measuring operation, transmitted in its entirety or transmitted in blocks, already during the still-running measuring operation, to the computer 30 via the transmitting interface 41 and is there likewise stored.

The drives of the coordinate measuring apparatus and therefore the position of the probe head is controlled in the measuring range of the apparatus with the aid of the (X, Y, Z) position control 46. The position control 46 receives the position data from an interpolator 48 which relates the geometric data with the selected desired speed $V_{des}$. The geometric data are transmitted from the coordinate measuring apparatus module 39 of the computer 30 to the control 40 via the input interface 49 and are transformed in function block 47 to control data.

The control module 45 generates the current for the solenoids of the measuring force generators (15, 16, 17) in the probe head. The control module 45 receives the necessary data via the input interface 49 as to the measuring forces ($F_x$, $F_y$, $F_z$) which are to be adjusted in the individual coordinate directions.

The feedback lines are identified by (a) and (b). The position control loops of the drives of the axes of the coordinate measuring apparatus (that is, the solenoids in the probe head) are closed via these feedback lines (a) and (b).

Measurements of form can be made on workpieces with the system described above by changing to the star probe 24 shown in FIG. 2a. The form measurements can take place as described, for example, in U.S. Pat. No. 5,471,406 incorporated herein by reference. Roughness of, for example, a workpiece surface 50 can be measured with the mounted roughness probe (118 to 122) according to the two methods described below.

Method 1

This method provides for traveling along the measurement path with the drives of the coordinate measuring apparatus.

The surface module 34 of the measuring software is addressed via the user menu 31. This module requires the input of various characteristic variables such as those for the digital profile filter (see DIN 4777), which is to be used for measured value evaluation, the length and position of the measuring path selected for the roughness measurement, amount and direction of the measuring force ($F_{des}$) as well as the pregiven velocity ($V_{des}$) which usually lies between 0.1 mm/s and 2 mm/s for roughness measurements.

Insofar as the inputted data are required for the control of the coordinate measuring apparatus, they are transmitted from the coordinate measuring apparatus module 39 to the input interface 49 of the control. Essentially, this is the start point for the measurement, a direction vector, and the pregiven velocity and measuring force.

Thereafter, the coordinate measuring apparatus travels with its drives to the workpiece surface 50 in the three axes with a scanning speed of approximately 1 mm/sec until the deflection of the measured value transducers (21, 22, 23) in the probe head announces the contact of the diamond tip 119 with the workpiece surface 50. After reaching this starting point, the apparatus follows the pregiven measurement path of approximately 5.6 mm with the speed of approximately 0.5 mm/sec adjusted for roughness measurement. The solenoid drives are so controlled that the probe tip 122 is in contact engagement with the surface 50 of the workpiece with a contact force of typically 0.05 N to 0.1 N. The deflections of the probe tip 122 generated in correspondence to the surface roughness are measured by the measurement value transducers (21, 22, 23) and are digitized at the fastest possible machine clock frequency and are stored together with the position measurement values in the intermediate memory 52. The position measured values are supplied by the counters of the length measuring systems.

After the measuring path has been traversed, the measured values from the intermediate memory 52 are transmitted via the output interface 41 to the software module 37 of the computer 30 and are there likewise completely secured. Thereafter, the stored measured values are converted with the aid of a digital profile filter into a waviness profile and a roughness profile of the workpiece surface 50. The roughness characteristic variables such as $R_a$, $R_z$ and $R_{max}$ are then computed from the roughness profile.

Before actual measurements on the workpiece, the position of the probe tip 122 in the coordinate system of the coordinate measuring apparatus is determined in a calibrating operation. This calibrating operation is performed in that, for example, and as is conventional in coordinate measurements, a test body (for example, a calibrating ball) is contacted at different locations.

Measurements which are carried out with the apparatus described above provide excellent results compared to conventional contact stylus instruments. Thus, the deviations of the measurement results for the profile roughness depth (PRt) were less than 1%. The profile roughness depth (PRt) was measured on a Hommel geometric normal Rt 8.9 µm and a Hommel geometric normal Rt 92 µm compared to a conventional contact stylus instrument RTH Form talysurf 120L. Comparison measurements on surfaces yielded deviations with respect to conventional contact stylus instruments of likewise only a few percent, that is, in a range which is permissible even for repeat measurements with a conventional roughness measuring system at various measuring locations.

FIG. 4 shows the detection of the surface profile 60 on a roughness normal Perthen PGN-3 having Rz=4.1 µm on a coordinate measuring apparatus of the type UPMC 550 Carat of Carl Zeiss which has been equipped with the measuring probe head described above and the components described with respect to FIGS. 3a and 3b. The roughness probe pin 118 was freely orientated in space (inclined at 45° in two planes) and the probe direction was approximately in the direction of the surface normal of the roughness normal positioned at an angle in space. The measurement result t-act of 0.0047 mm for the depth of roughness lies, even without filtering, in the range of the desired value of 0.0041 mm when the specified contact unreliability K3 of 0.8 µm for the probe head used is considered.

Method 2

The second method provides that the measuring path is traversed with the drives of the coordinate measuring apparatus at standstill.

This method runs in substeps in the same manner as the method described above. However, after the first contact of the workpiece surface with the diamond tip 122, the drives of the measuring slide of the coordinate measuring apparatus are brought to standstill. Thereafter, and parallel to the direction of the normal of the workpiece surface to be checked, the measuring force, which is required for the roughness measurement, is adjusted to approximately 0.05 N and the diamond tip is then moved slowly with the aid of the measuring force generators in the probe head along the preselected measuring line, that is, perpendicular to the contact direction slowly at 0.1 mm/sec over the workpiece surface. The measuring signals of the inductive measuring systems (21 to 23) generated hereby are then processed in the same manner as described for the first method. However, during this movement, the camber changes because the parallelogram guides do not move on an ideal straight line. For this reason, the measured values recorded over the measuring path are folded with a circular-arc-shaped function.

In the roughness measurements of method 2, the influence of the deviations of the parallelogram guide from an ideal straight line referred to above can be eliminated by means of a profile filter in the context of the measured value evaluation in the surface module 34. The influence on the configuration of the profile (waviness) can be eliminated in that the deviations of the parallelogram guide from an ideal straight line are subtracted in the computer 30 from the measured values stored in the memory 38. This correction is carried out by the measurement data processing module 37 in the computer 30.

For the function blocks of the control 40 shown in FIGS. 3a and 3b, it is not absolutely necessary to have discrete electronic components. These components can be likewise simulated by the firmware of a correspondingly programmed microprocessor which defines the essential component of the control of the coordinate measuring apparatus.

An appropriately adapted evaluation software can also be used as surface module 34 in the software of the computer 30 as it is offered for conventional contact stylus instruments.

It is understood that the foregoing description is that of the preferred embodiments of the invention and that various changes and modifications may be made thereto without departing from the spirit and scope of the invention as defined in the appended claims.

What is claimed is:

1. A method for measuring roughness of a surface of a workpiece with a coordinate measuring apparatus including a probe head having a coordinate measuring probe for making coordinate measurements on a workpiece of the geometric dimensions thereof and having a mounting device for replaceably mounting said coordinate measuring probe on said probe head and said probe head having signal transducers mounted therein for supplying a first set of measurement signals (x', y', z') indicative of said geometric dimensions, the method comprising:

removing said coordinate measuring probe from said mounting device and mounting a passive probe thereon having a contact probe body completely devoid of signal transducers and defining a tip suitable for making roughness measurements;

scanning said surface with said contact probe body with a slight force ($F_x$, $F_y$, $F_z$) applied via said probe head to said contact probe body with said tip on said surface of said workpiece to obtain a second set of said measurement signals (x', y', z') outputted by said signal transducers in response to deflections of said passive probe because of said roughness;

processing said second set of measurement signals (x', y', z') and storing the same as digital measured point sequences; and, determining roughness characteristic variables of said surface from said measured point sequences.

2. The method of claim 1, wherein said coordinate measuring apparatus includes a drive for a measuring slide; and, said method further comprising moving said contact probe body over said surface with said drive.

3. The method of claim 1, wherein said coordinate measuring apparatus has measuring slides and said probe head includes force generators for deflecting said contact probe body in several coordinate directions; and, said method comprising the step of moving said contact probe body over said surface of said workpiece with said force generators when said measuring slides are at standstill.

4. The method of claim 3, wherein said coordinate measuring apparatus has guides (x, y, z) for said measuring slides; and, the method comprising the step of scanning said surface of said workpiece in a direction spatially inclined with respect to said guides (x, y, z).

5. The method of claim 4, wherein said guides are in said probe head; and, the method comprising correcting for deviations of said guides from an ideal plane or straight line utilizing a computer.

6. The method of claim 1, wherein the profile of said surface is generated as a quasi-analog measured point sequence.

7. The method of claim 1, wherein said measured point sequence is digitally filtered.

8. The method of claim 1, wherein the position of said tip for roughness measurements is determined in the coordinate system of said coordinate measuring apparatus on a calibrating body.

9. A coordinate measuring apparatus for determining geometric dimensions of a workpiece in various coordinate directions (x, y, z) and for measuring the roughness of the surface of said workpiece, the coordinate measuring apparatus comprising:

a measuring probe head for determining said geometric dimensions and said roughness of said surface;

a coordinate measuring probe suitable for making measurements of said geometric dimensions in said various coordinate directions (x, y, z);

a passive probe completely devoid of signal transducers and having a contact probe body defining a tip suitable for making roughness measurements of said surface of said workpiece;

said measuring probe head having a mounting device for interchangeably mounting said coordinate measuring probe and said passive probe thereon;

said measuring probe head including signal transducers mounted therein for supplying a first set of measurement signals (x', y', z') proportional to the deflections in said various coordinate directions (x, y, z) when said coordinate measuring probe is mounted on said measuring probe head via said mounting device and for also producing a second set of measurement signals (x', y', z') indicative of said roughness when said passive probe is mounted on said measuring probe head via said mounting device and moved over said surface;

a signal processing circuit connected to said signal transducers for obtaining a measuring point sequence from said second set of measurement signals (x', y', z');

a memory connected to said signal processing circuit for storing said measuring point sequence; and, a computer equipped with an evaluation software for computing roughness characteristic variables from the stored measuring point sequence.

10. The coordinate measuring apparatus of claim said probe head having guides for measuring slides and said guides defining a reference for said roughness measurements.

11. The coordinate measuring apparatus of claim 10, further comprising a data processing unit for correcting deviations of said guides from an ideal planar surface or straight line.

12. The coordinate measuring apparatus of claim 9, said mounting device including a deflectable probe holder; and, said probe head including guides for said probe holder; and, said guides defining a reference for said roughness measurements.

13. The coordinate measuring apparatus of claim 9, further comprising a track for said probe head; and, said track defining a reference for said roughness measurements.

14. The coordinate measuring apparatus of claim 9, said software including several modules for selectively evaluating said measured values (x', y', z') supplied from said measurement signals as macro geometry data including dimension, form, and position or surface data including roughness and waviness and a further module for adjusting parameters required for obtaining a measured value; and, said parameters including measured length, measuring direction, measuring force, scanning speed and probe type.

15. The coordinate measuring apparatus of claim 9, said tip being a tip having an uninterrupted surface.

* * * * *

UNITED STATES PATENT AND TRADEMARK OFFICE
CERTIFICATE OF CORRECTION

PATENT NO. : 5,778,551
DATED : July 14, 1998
INVENTOR(S) : Henrik Herklotz, Thomas Arndt, Rainer Ohnheiser and Karl Schepperle It is certified that error appears in the above-identified patent and that said Letters Patent is hereby corrected as shown below:

In column 1, line 13: delete "mm$^3$" and substitute -- m$^3$ -- therefor.

In column 7, line 67: delete "talysurf" and substitute -- Talysurf -- therefor.

In column 8, line 8: delete "Rz" and substitute -- R$_z$ -- therefor.

In column 8, line 16: delete "0.0047" and substitute -- 0.0045 -- therefor.

In column 9, line 12: delete "V'" and substitute -- y' -- therefor.

In column 10, line 34: between "claim" and "said", insert -- 9, --.

Signed and Sealed this

Thirty-first Day of August, 1999

*Attest:*

Q. TODD DICKINSON

*Attesting Officer*     *Acting Commissioner of Patents and Trademarks*